No. 880,362. PATENTED FEB. 25, 1908.
J. D. COOPER.
CANE HARVESTER.
APPLICATION FILED NOV. 4, 1905.

3 SHEETS—SHEET 2.

Witnesses:
Inventor:
John D. Cooper
By Attorney

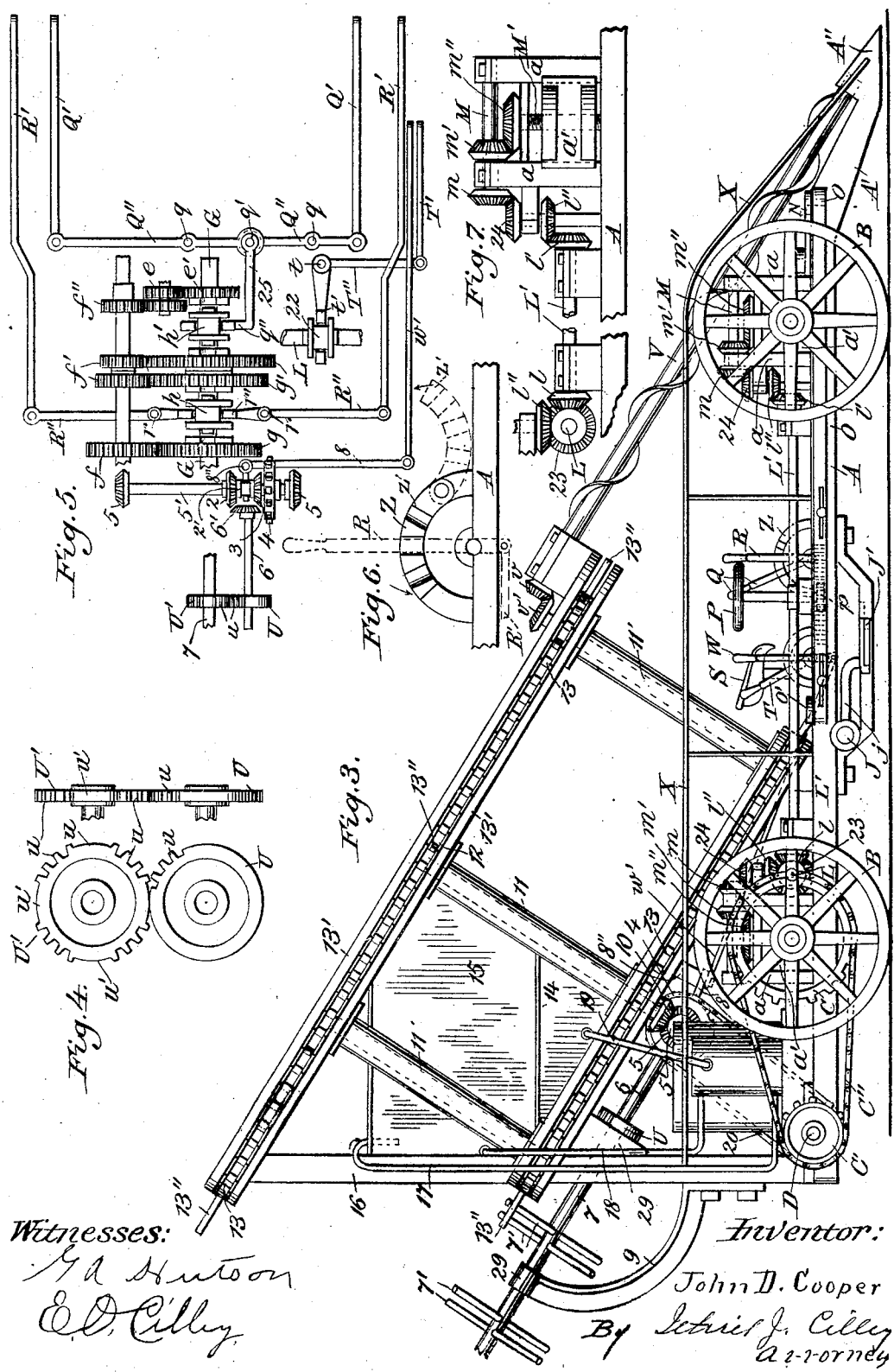

UNITED STATES PATENT OFFICE.

JOHN D. COOPER, OF GRAND RAPIDS, MICHIGAN.

CANE-HARVESTER.

No. 880,362.  Specification of Letters Patent.  Patented Feb. 25, 1908.

Application filed November 4, 1905. Serial No. 285,905.

*To all whom it may concern:*

Be it known that I, JOHN D. COOPER, a citizen of the United States, residing at Grand Rapids, in the county of Kent and State of Michigan, have invented certain new and useful Improvements in Cane-Harvesters, of which the following is a specification.

Figure 1:
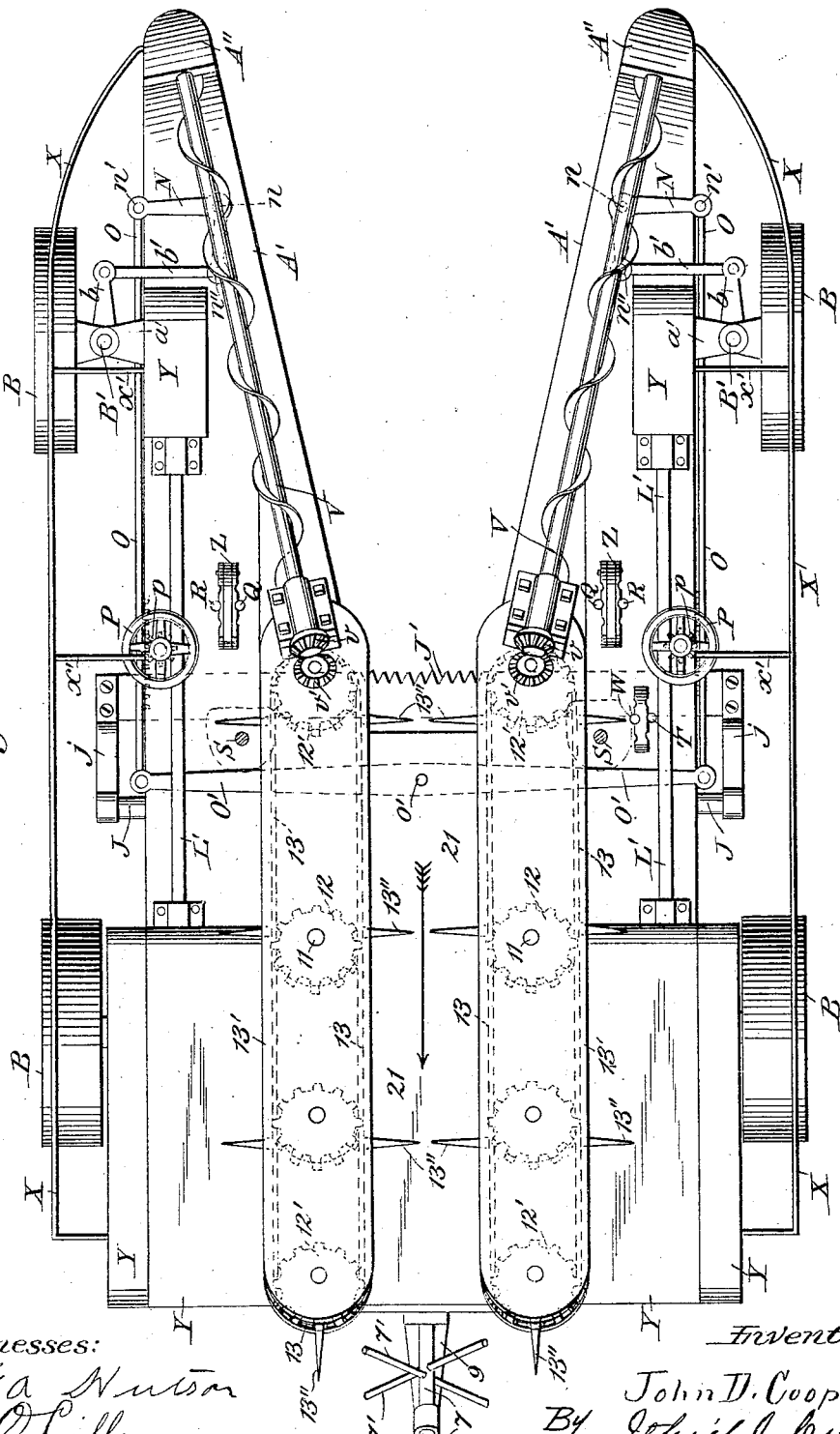
Figure 2:
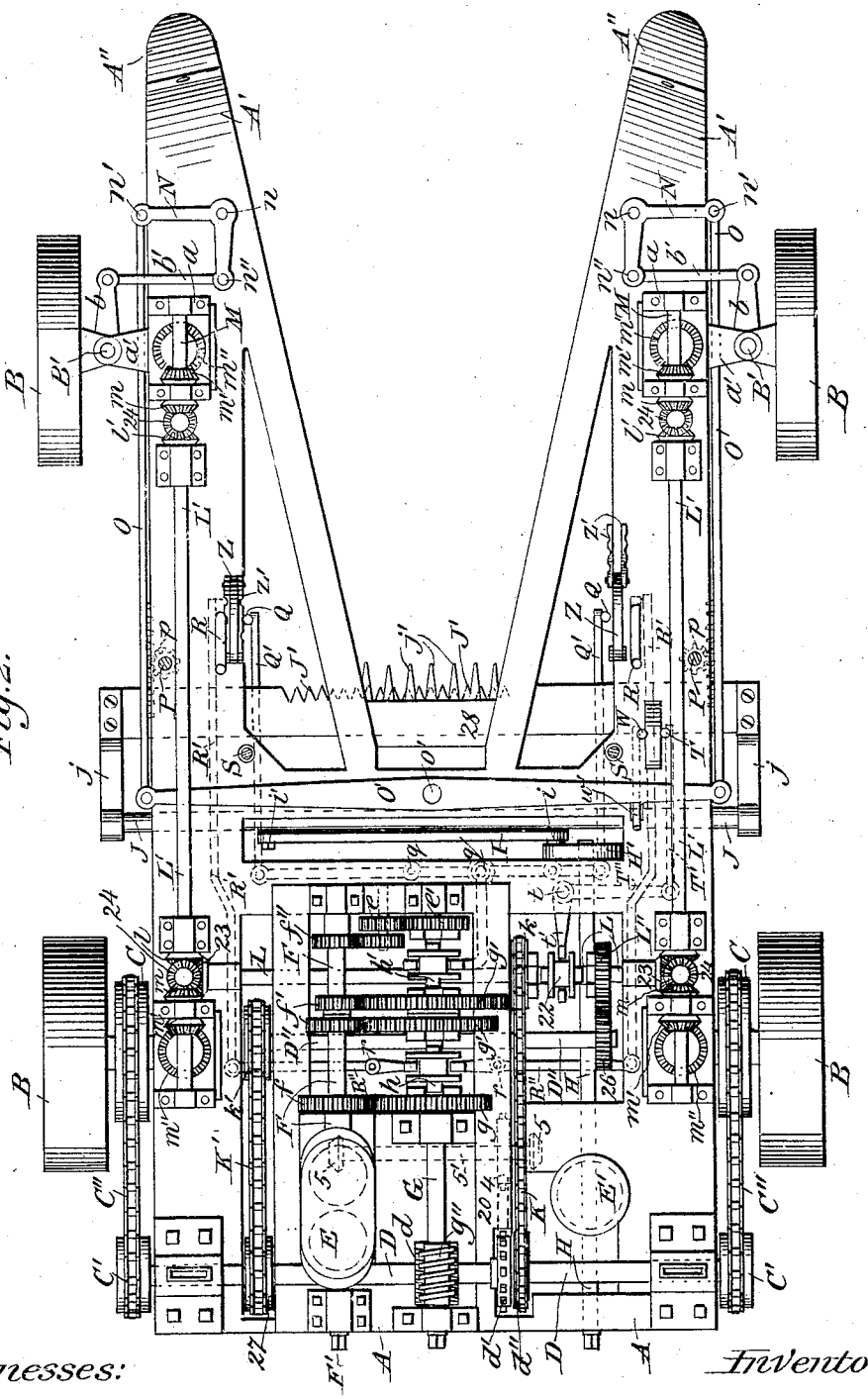

My invention relates to improvements in machines for harvesting sugar cane, hemp and other hard stemmed plants, and its objects are: first, to insure a clean severance of the stem; second, to provide a means for picking up and supporting fallen plants, in position to insure severing them from the stump; third, to provide a machine that will drop the severed plants in separate piles, and, fourth, to provide a machine by which the cutter or saw will be run independent of the propelling power of the machine. I attain these objects by the mechanism illustrated in the accompanying drawing, in which Figure 1 is a plan of the machine with the seat and the steering wheel removed; Fig. 2 is the same with the entire upper works removed to show the distribution of the several parts of the propelling and steering machinery; Fig. 3 is a side elevation of the complete machine; Fig. 4 is an elevation of the gear wheels that actuate the dumping shaft.
Fig. 5 is a plan of the driving and reversing mechanism and of the gears that actuate the dumping shaft and of the levers and rods with which they are manipulated. Fig. 6 is an elevation of one of the segments that govern the action of the several levers, showing the pieces having the detents detached and pivoted to the segment so that they may be thrown over out of the way and allow the levers to move freely when desired, and, Fig. 7 is a side elevation of the wheel supporting standard and the adjustable box that the axletree of the wheels are pivoted to.

Similar letters refer to similar parts throughout the several views.

This machine is supported upon a body A, having the front end divided to form an entrance between the side arms A' A', adjustably supported upon the wheels B; the hind wheels being journaled directly upon a bearing made integral with their adjustable boxes $a'$, and the forward wheels are pivotally attached to their adjustable boxes, $a'$, by the bolt B', in such a manner that the machine may be readily guided thereby, as hereinafter more fully described.

The propelling mechanism for the machine consists: first, of the engine E, which is directly connected to the shaft F. This shaft has, securely mounted thereon, the several spur gear wheels $f$, $f'$ and $f''$, which are arranged to mesh with corresponding gear wheels $g$, $g'$ and $e'$, loosely mounted on the shaft G. Clutches $h$ and $h'$ are, also, mounted upon the shaft G in such a manner that while they may be slid endwise upon the shaft they cannot be made to revolve without revolving the shaft, thus: if the clutch $h$ is thrown to the left to engage the gear $g$, the shaft G will be made to revolve at the fastest speed possible with this transmission. If moved to the right to engage the gear $g'$ the shaft will be made to revolve slower, and if the clutch $h'$ is moved to the left to engage the second gear $g'$ the shaft will move still slower, and if it is moved to the right to engage the gear $e'$ the shaft will, through the action of the gear $f''$ and the intermediate gear $e$, be revolved in the opposite direction for reversing the travel of the machine, the shaft G being made to revolve the shaft D by the action of the worm gear $g''$ on the shaft G and $d$ on the shaft D, said revolving motion being transmitted to the hind wheels B B by the sprocket chain C'' driven from the sprocket wheel C' and driving the sprocket wheels C, which latter are securely attached to the hind wheels B.

The clutch $h$ is manipulated by means of the lever R through the medium of the rod R' which is pivotally connected to the lever R'', and the latter is pivotally secured to the machine frame at $r$ in position so that the end $r'$ will engage the clutch $h$ to manipulate it in the usual manner of manipulating this class of clutches; and the clutch $h'$ is manipulated by the lever Q, through the medium of the rod Q', the opposite end of which is pivotally connected with the lever Q'', the latter being pivotally connected with the machine frame as at $q$, in the usual manner, the free end of said lever being connected with the slide 25 so that this slide will be made to slide longitudinally so that its right angled arm $q''$, engaging the clutch $h'$ will cause that clutch to move with the slide and engage the second gear $g'$ and run the machine very slow, or engage the gear $e'$ and run the machine backward. It will be noticed that I have shown the lever system, hereinbefore described, in duplicate. The reason for this is that it is often necessary for the driver to sit on one side of the machine and often on the other, according to whether the open field from which the cane has been cut is to the right or to the left of the machine, it being necessary that the operator should sit in position to plainly see the ground over which he is working, and, consequently, a set of these levers and rods must be provided for each side of the machine, as the driver could not reach across the machine to operate the one set, the same being the case with the several other sets of reversing and operating levers to be hereinafter described except that it is not necessary to duplicate the levers T and W, and their connections for adjusting the height of the machine and the direction of the shaft 7 may revolve, as it is not necessary to adjust these except on one side of the machine. The engine and transmission gear, hereinbefore described, is, as will be readily seen, a simple modification of the transmission mechanism in common use upon automobiles.

The levers Q and R may be held to position by the detents in the pivoted portion Z' of the segment Z, and when the operator is manipulating these levers on one side of the machine the levers on the other side of the machine may be left free to move accordingly, by swinging the plates Z' over to the position indicated by the dotted lines in Fig. 6, which leaves the surface of the segment Z smooth and out of contact with the levers, which leaves these levers free to move as the corresponding levers on the other side of the machine are being manipulated.

The hubs upon which the wheels B B, at the front end of the machine, revolve are pivotally secured to the adjustable boxes $a'$ by the bolts B', said bolts being securely attached to the hubs of the wheels and to the arms $b$, and revolubly supported in the box $a'$, so that any lateral movement of free end of the lever $b$ will be communicated to the wheels B to vary their position relative to the body of the machine for the purpose of steering the machine in the desired direction. To bring about this result I pivot angle levers, or bell cranks N to the arms A', as at $n$, with the ends $n''$ connected, by means of the rod $b'$, with the end of the lever $b$, and the end $n'$ of the bell cranks pivotally connected with the sliding bars O; said bars being connected at the back ends with a lever O', centrally pivoted to the machine frame at $o'$ so that any motion given to the bell crank N on one side of the machine will be transmitted to the bell crank on the other side of the machine in the opposite direction so as to give to both wheels the same position in the same direction, so that the front end of the machine will be carried in the desired direction by the proper manipulation of these angle levers, which is brought about by the action of the gear wheels $p$, shown in dotted lines in Figs. 1, 2 and 3, upon the gear teeth in the bars O, shown in corresponding position in Fig. 3, actuated by the steering wheel P, all in the usual manner of steering automobiles, except that in this case the equalizing bar cannot pass directly across from one lever $b$ to the other, hence the necessity of the sliding bars O and the connecting lever O', and other actuating devices shown and described in this connection.

It is not only desirable, but almost necessary that the body of the machine be arranged so that it may be conveniently raised and lowered, as, when in use cutting cane or hemp the ends A'' of the arms A' should travel just below the surface of the ground so as to insure the picking up of any and all stalks that may have been blown or bent over, while in traveling along the highway it would be necessary to raise these ends considerably above the ground and, besides this, an uneven surface of ground would require that the body of the machine be carried higher from the ground than a level surface would, and varying surfaces might require varying heights to be assumed, and for this purpose I place two sprocket wheels, $d''$ and 27, on the shaft D. From the sprocket wheel $d''$ a sprocket chain K passes to, and actuates the sprocket wheel $k$, which is revolubly mounted on the shaft L so that when this sprocket wheel is engaged by the clutch 22 it will revolve the shaft in the same direction that the shaft D is revolving. From the sprocket wheel 27 the sprocket chain K' passes to and around the sprocket wheel $k'$, which is securely attached to the shaft D''. At the opposite end of this shaft is a gear wheel 26, securely fastened thereon in position to mesh with the revoluble gear wheel L'', on the shaft L, so that when the gear wheel L'' is engaged by the clutch 22 the shaft will revolve in a direction opposite to the shaft D, and when the clutch 22 is held in position to engage neither the sprocket wheel $k$ or the gear wheel L'' the shaft L will remain idle.

At each end of the shaft L is a bevel gear 23, arranged to mesh with the gear $l$ on the shaft L', said shaft L' having a gear $l'$ on the opposite end that meshes with the gear $l''$ to drive the gear 24 and, through it, the shaft M, by means of the gear $m$, and the gear $m'$, on the shaft M, meshes with the gear $m''$ on the screw M, causing said screw to revolve and as the screw passes through the box $a'$ with a screw thread in the box, the box is, thereby, raised and lowered relatively with the frame of the machine, actually raising and lowering the said frame from and toward the surface of the ground. The gear wheels 23, also, mesh with gear wheels $l''$ at the lower end of the shaft that carries the gear wheels $l'''$, for the back wheels B of the machine, the same as the gear wheel l' meshes with the gear wheel l'' at the front of the machine, and for the purpose of engaging both this wheel l'' and the wheel l on the shaft L' it is necessary that the gear wheel 23 be made large enough to engage these wheels, standing at right angles with each other, without danger of the wheels l and l'' coming in contact with each other.

The clutch 22 is secured on the shaft in such a manner that it may be slid longitudinally of said shaft but cannot be made to revolve on the shaft, and is actuated longitudinally of the shaft to be made to engage, alternately, the sprocket wheel k or the gear wheel L'', by means of the lever T, through the medium of the rod T', the lever T'', which is pivoted to the machine frame at t, and its right angle arm t' which is so located that it will engage the chuck 22, in the usual manner.

To drive the cutting tool or saw J' I provide an auxiliary engine E', providing power therefor independent of the power that drives the machine, thus averting the danger of clogging the saw when the power for moving the machine is overtaxed. Another very decided advantage of this auxiliary engine is that if very large stalks are encountered, the machine may be stopped entirely, or may be made to move very slowly while the saw is being driven at full speed.

The engine E' is directly connected with the shaft in the usual manner, and this shaft carries the crank H' to which the pitman or connecting rod I is pivoted at i, whence it extends to, and is pivoted to the reciprocating bar J at i', so that the revolving motion of the shaft H is converted into a reciprocating motion in the bar J. The bar J has an arm j at each end, to which the saw J' is secured so that the reciprocating motion of the bar J is transmitted to the saw J' in such a manner that any plant stem passing between the arms A' to the saw J' will be severed by the saw.

The fingers j', shown in Fig. 2, are integral with the stationary cross bar 28 and are for use, only to support the stalks where small tender stalks are being harvested, as sometimes occurs in the harvesting of hemp, &c., the naked saw, shown in Fig. 1, being necessary when large or tough stalks, as in sugar cane or large well developed hemp &c., are being harvested.

To carry the stalks through the machine after they have been severed by the saw, I provide conveyers consisting of sprocket chains 13 13 supported in the frame 13' upon the posts 11', see Fig. 3. These sprocket chains are mounted upon sprocket wheels 12', shown in dotted lines in Fig. 1, and are driven by the center wheels 12 mounted upon the shafts 11, which, in turn, are provided with bevel gears 10 at the lower end in position to mesh with the bevel gears 5 at each end of the shaft 5', this shaft, in turn, being made to revolve by a sprocket chain 20, see Fig. 3, passing from the sprocket wheel d' on the shaft D, see Fig. 2, to the sprocket wheel 4 on the shaft 5'.

For the purpose of picking up bent or lodged stalks when they are in the rows between the arms A' I provide for throwing the points A'', of the frame arms A', just below the surface of the ground, or low enough to insure the picking up of stalks lying close to the ground and, from this point up to the conveyer frame 13' I place a shaft, at each side of the machine, having a serpentine or screw shaped flange extending its entire length, see V V in Figs. 1 and 3, that will engage the stalk as soon as it has been picked up by the point A'' and carry it to a vertical position where the arms 13'' projecting from the sprocket chains 13 and traveling in the direction of the arrow in Fig. 1, will engage it and carry it through the elevating portion of the machine in position to be dropped into the dumping arms 7' on the shaft 7, it being understood that each stalk, as soon as it is cut off by the saw J', is engaged by the arms 13'' and carried through the machine over the floor 21, which projects from the surface of the saw to the back of the elevator frame, as indicated in Figs. 1 and 3.

The dumping arm shaft 7, necsesarily shown short in the drawings, projects back from the back end of the conveyer frame or standard, 16, and is provided with crossed arms 7', so arranged that any stalks that pass through the machine will drop between the pairs of arms and be there held and carried until the arms are turned so as to dump them out on the ground, when another pair of arms are in position to receive the oncoming stalks. This shaft 7, is supported in the box 22 and by the arm 9, and is made to revolve at intervals by means of the gear wheel U', which is provided, alternately, with teeth u and plain spaces u', so arranged that while the teeth u on the wheel U are in mesh with the corresponding teeth on the wheel U' the wheel U' will be made to revolve one quarter around, and when the blank space u' of the wheel U is traveling in the blank space u' of the wheel U' the latter wheel retains its position with the arms 7' in position to catch and hold the oncoming stalks the gear wheels U and U' being arranged to dump the stalks about once in each three revolutions of the wheels B.

The wheel U is mounted upon the shaft 6, which has a gear wheel 6' secured to its back end in position to be engaged by either the gear wheel 2 or 3 on the shaft 5', the latter gear wheels being connected by a collar so that they may be shifted to the right or left, longitudinally of the shaft 5' to cause the shaft 6 to revolve to the right or to the left, as may be desired, but so secured to said shaft 5' that they must revolve with the shaft.

My appliance for manipulating the gear wheels 2 and 3 to the right or left consists of the lever W, the connecting rod w' between said lever and the lever 8, the latter being pivoted to the machine at 8'' and having a right angled arm that engages the collar 2' that connects the gear wheels 2 and 3, to manipulate said gear wheels in the usual manner.

14 is the gasolene tank; 15 is the water tank; 17 is the return pipe from the engine to the water tank; 18 is the pipe leading from the water tank to the engine; and 19 is the pipe leading from the gasolene tank to the engine. X is a guard to prevent fallen cane from entangling the wheels. Y Y represent covers over the sprocket wheels C C', chain C'' and gear wheels m m'. v v' represent gear wheels for driving the shaft V.

A very important result attained with this machine is the ability to cut the plant clean without danger of pulling it up by the roots or bending the stalks over and loosening the roots and endangering the life of the plants, which can be done, only, with a reciprocating saw, as a knife, shearing jaws or other analogous device is not likely to cut the stalk, especially if very large and tough, quick enough but that the forward motion of the machine is more than likely to pull the roots from the ground, or to disturb them sufficiently to endanger the life of the plants; and the machine is likely, also, to drag the plant along with it and thus to so clog the machine that other plants cannot be cut until the machine has been stopped and the obstructing plant removed, a difficulty that can never occur with a reciprocating saw run independent of the power that propels the machine.

It is very necessary, with this machine, that the saw be placed some little distance below the body A A' so that the cane stalks may be cut as close to the ground as possible, for two reasons: first, to save all the valuable portion of the plant, and, second, to avoid, as far as possible, the danger and disadvantage of having the dead stumps projecting inconveniently high above the ground. It also averts the danger of the body of the machine coming in contact with the ground, especially where sharp knolls exist, or of coming in contact with small stumps, stones, &c.. that might be in the way.

Having thus fully described my invention, what I claim as new and desire to secure by Letters Patent of the United States, is:

1. In a machine for harvesting cane, a body, wheels supporting said body, mechanism for raising and lowering the body relative to the wheels, a propelling engine mounted on the body, speed and reverse gear connected with the engine, a shaft extending from said gear, a main driving shaft to which said shaft is geared, chains connecting the main driving shaft and the wheels of the machine, levers for manipulating the speed and reversing gear, front wheels journaled upon axletrees, said axletrees pivoted to the frame of the machine, levers for changing the position of the wheels to guide the machine, two arms projecting from the front of the machine, conveyers on the machine shafts having screw shaped flanges extending the length of said arms and connected with the conveyers, a reciprocating saw in said machine and an auxiliary engine connected to drive said saw.

2. In a machine for harvesting cane, a frame divided at the front end forming two forwardly projecting arms, hind wheels journaled to the body of the machine, forward wheels journaled and pivotally connected with the projecting arms, levers, connecting rods and gear for swinging the forward wheels to guide the machine, a propelling engine, speed and reversing gear connected with said engine, a shaft connected therewith, and a screw gear mounted thereon, a screw gear on the main shaft engaging said screw gear, sprocket wheels on the driving shaft, sprocket wheels on the hind wheels of the machine, sprocket chains engaging said sprocket wheels, levers and clutches for manipulating the speed and reversing gear, shafts, gear wheels, screws and reversing shaft, a reversible clutch and actuating levers for raising and lowering the body of the machine relative to the wheels, an auxiliary engine, a reciprocating saw connected with and driven by said engine, sprocket wheels, sprocket chains, and arms projecting from said chains forming an elevator to carry cane to and through the machine, shafts connecting the end of the elevator with the front end of the arms and having a screw flange coiled the length of them, and a revoluble dumping arm back of the elevator.

3. In a machine for harvesting cane, front and hind wheels, a body having the front end divided forming two forwardly projecting arms, vertically movable boxes secured to the body, at each side of both the front end and the back end thereof the hind wheels journaled directly to the boxes at the back end and the forward wheels journaled and pivotally connected to the boxes at the front end of the body, means for turning the forward wheels for guiding the machine, means for raising and lowering the boxes relative to the body of the machine, a propelling engine, speed and reversing gear connected therewith, levers and rods for manipulating these gears, a reciprocating saw, an auxiliary engine connected to drive the reciprocating saw, sprocket wheels, sprocket chains, and arms projecting from said chains in position to carry the cane through the machine, shafts having screw shaped flanges their entire length, passing from the ends of the arms of the machine to the conveyer chains, and a dumping arm having cross arms, an actuating wheel connected to said arm and having gear teeth at intervals, a driving wheel meshing therewith and having teeth to actuate said actuating wheel at intervals, driving gear connected with the driving wheel, and means for engaging, disengaging and reversing said gear.

4. In a machine for harvesting cane, wheels, a body supported on said wheels and vertically adjustable thereon, a propelling power, a saw located below the body of the machine, sprocket chains and arms for carrying the severed stalk back from the saw, and shafts having screw shaped flanges their entire length for carrying drooping plants properly to the saw.

Signed at Grand Rapids, Michigan, October 24, 1905.

JOHN D. COOPER.

In presence of—
  URL CILLEY,
  ITHIEL J. CILLEY.